(12) United States Patent
Wheatley

(10) Patent No.: US 6,499,791 B2
(45) Date of Patent: Dec. 31, 2002

(54) HINGED J-STRIP FOR A TONNEAU COVER

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 09/872,369

(22) Filed: Jun. 1, 2001

(65) Prior Publication Data

US 2002/0180235 A1 Dec. 5, 2002

(51) Int. Cl.[7] .................................................. B60P 7/04
(52) U.S. Cl. .............................. 296/100.16; 296/100.18
(58) Field of Search ....................... 296/100.16, 100.17, 296/100.18, 36, 100.15, 100.01; 160/327, 368.1, 370.21, 383, 354

(56) References Cited

U.S. PATENT DOCUMENTS

| | | | |
|---|---|---|---|
| 4,838,602 A | 6/1989 | Nett | |
| 5,058,652 A | 10/1991 | Wheatley et al. | |
| 5,121,960 A | 6/1992 | Wheatley | |
| 5,365,994 A | 11/1994 | Wheatley et al. | |
| 5,487,585 A | 1/1996 | Wheatley | |
| 5,553,652 A | * 9/1996 | Rushford | 160/354 |
| 5,772,273 A | 6/1998 | Wheatley | |
| 5,788,315 A | 8/1998 | Tucker | |
| 5,984,400 A | 11/1999 | Miller et al. | |
| 6,024,402 A | 2/2000 | Wheatley | |
| 6,053,558 A | * 4/2000 | Weldy et al. | 160/374.1 |
| 6,257,306 B1 | * 7/2001 | Weldy | 160/327 |

* cited by examiner

Primary Examiner—D. Glenn Dayoan
Assistant Examiner—Patricia L. Engle
(74) Attorney, Agent, or Firm—Harness, Dickey & Pierce, P.L.C.

(57) ABSTRACT

A vehicle tonneau system having a flexible fabric cover and a rail system having flanges attached to a vehicle for mounting the flexible fabric cover in which elongated fasteners for attaching the flexible cover to the rail flanges are provided with a hinging portion. A portion of the fastener is pivoted about the hinging portion which eases the initial removal of the fastener. Once a distal end of the fastener is moved past a terminal edge of the rail flange, the remainder of the fastener easily peels from the frame, by lifting the flexible fabric cover.

20 Claims, 3 Drawing Sheets

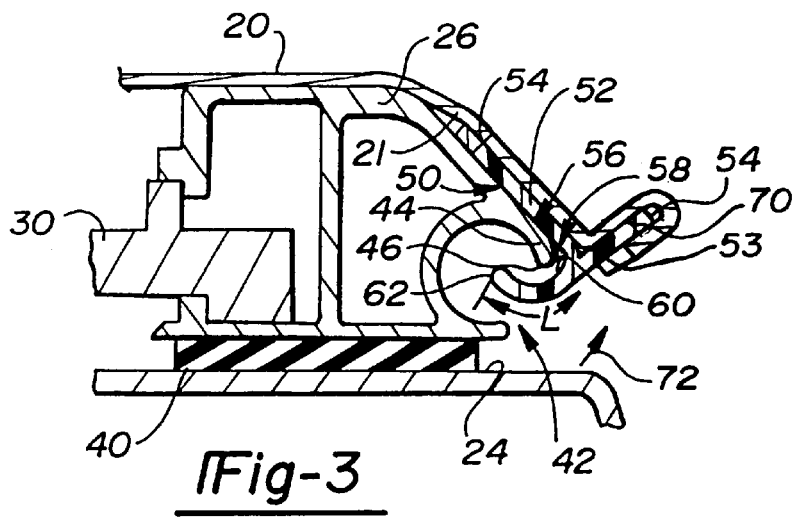
Fig-3
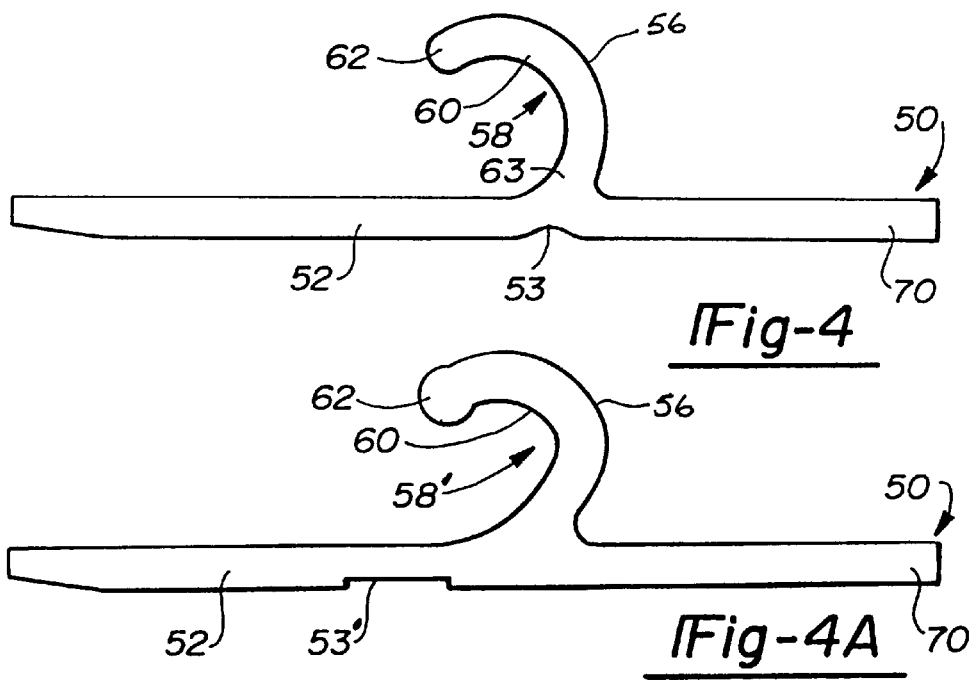
Fig-4
Fig-4A
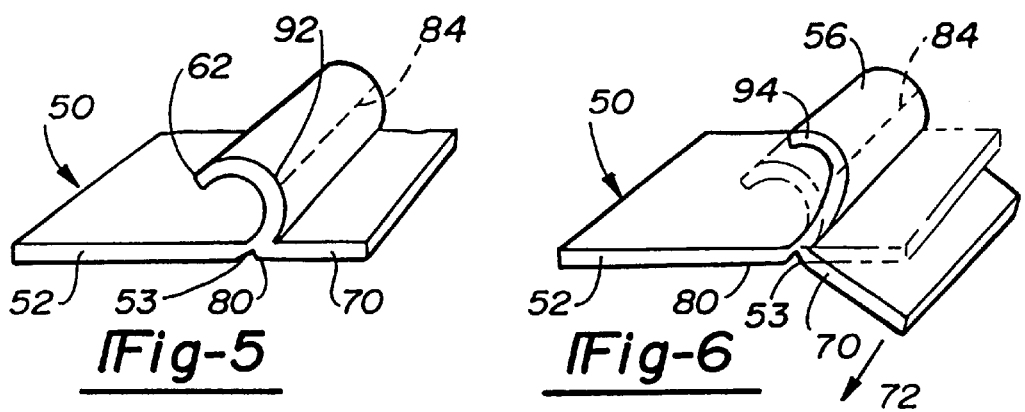
Fig-5
Fig-6

HINGED J-STRIP FOR A TONNEAU COVER

BACKGROUND AND SUMMARY OF THE INVENTION

The present invention relates generally to flexible tonneau covers for vehicles and in particular to an improved release for removing a tonneau cover that uses an extruded j-strip or hook fastener along the edge of the flexible tonneau cover to attach the cover fabric to the vehicle.

Tonneau covers are generally defined as any device which can be used to cover a portion of a vehicle. While tonneau covers are generally used to cover convertible cars, boats and trailers, tonneau covers are most commonly associated with pick-up trucks. Both rigid and flexible tonneau covers are available for covering the cargo box of pick-up trucks. The present invention relates to flexible tonneau covers.

Flexible tonneau covers for pick-up trucks typically include a rectangular frame made of extruded aluminum rails which are attached to the pick-up truck at the top of the cargo box. A flexible fabric cover is then attached to the rails to cover the cargo box. The fabric is generally a woven material with a vinyl coating. The term "fabric" is used throughout this specification in the broad sense to mean a flexible sheet material and is not limited to a woven material.

One mechanism used to attach the flexible fabric to the frame is a j-strip or elongated hook shaped fastener attached along the edge of the flexible fabric. The j-strip or fastener is wrapped around a flange formed in the frame for the purpose of mounting the fabric. The cover is removed from the frame by lifting the fabric off of the frame, beginning at one corner and peeling the fastener from the flange formed in the frame along each edge of the fabric. In some situations, particularly in cold weather, it can be difficult to begin the initial removal of the fastener from the frame at the corner of the cover. This difficulty in removing the fastener in cold temperatures is caused by fabric shrinkage and increasing stiffness in the j-strip or hook shaped fastener. Once an initial portion of the j-strip or hook shaped fastener is removed from the frame, the fastener will easily peel along the entire length of the cover.

It is an object of the present invention to provide a mechanism for easing the removal of the fastener and fabric from the frame, while at the same time maintaining a tight fit of the fabric on the frame.

Another object of this invention is to provide a mechanism for easing the mounting of the fastener and fabric to the frame.

The present invention eases the mounting and removal of the j-strip or fastener from the frame by providing a j-strip or hook shaped fastener with a hinge, notch, score, groove or crease formed therein. The hinge, notch, score, groove or crease formed in the j-strip or fastener allows the base of the fastener to be bent, pivoting the hook of the fastener away from the base of the fastener and thus away from the flange of the rail to aid in the release of the fastener. This bending of the hook relative to the base operates to widen or open the throat of the hook. In addition to widening or opening the throat of the hook, the enhanced bending action of the hook reduces the distance from the bottom or curve of the hook to the tip of the hook. This reduces the distance by which the fastener must be moved, relative to the flange formed in the frame, to achieve the initial fastener removal. Once an initial edge of the fastener is moved past the terminal edge of the flange formed in the frame, the remainder of the fastener will easily peel from the frame by lifting the fabric from the rail.

By providing a hinge, notch, score, groove or crease in the fastener, less force is required to achieve removal of the fastener.

The hinge is positioned in the base of the fastener on the opposing side from which the hook extends. Preferably, the hinge is located either substantially opposite a merger point of the hook and the base or above the merger point in the direction of the hook's distal end. The latter positioning being the more preferred positioning.

Further objects, features and advantages of the invention will become apparent from a consideration of the following description and the appended claims when taken in connection with the accompanying drawings.

BRIEF DESCRIPTION OF THE DRAWINGS

FIG. 3 is an enlarged sectional view of the fastener and frame showing the fastener being removed from the frame;

FIG. 4 is an enlarged side elevational view of a first embodiment of the fastener of the present invention;

FIG. 4A is an enlarged side elevational view of a second embodiment of the fastener of the present invention;

FIG. 5 is a partial perspective view of the fastener as seen in FIG. 4;

FIG. 6 is a partial perspective view of the fastener as seen in FIG. 5, with the tab being deflected for removing the fastener from the rail.

DETAILED DESCRIPTION OF THE PREFERRED EMBODIMENTS

The following description of the present invention is merely exemplary in nature and is in no way intended to limit the invention or its uses. Moreover, the following description, while depicting a fastener designed to operate with a particular rail system, is intended to adequately teach one skilled in the art to make and use a fastener for any similar rail system including those which clamp through a stake box.

Figure 1:
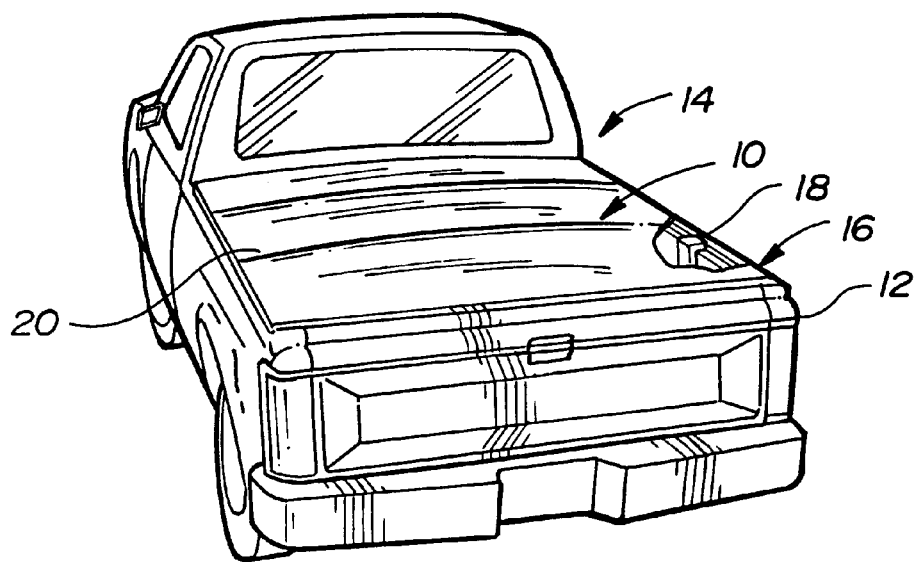
FIG. 1 is a perspective view of a pick-up truck cargo box with the tonneau cover of the present invention installed thereon.
Figure 2:
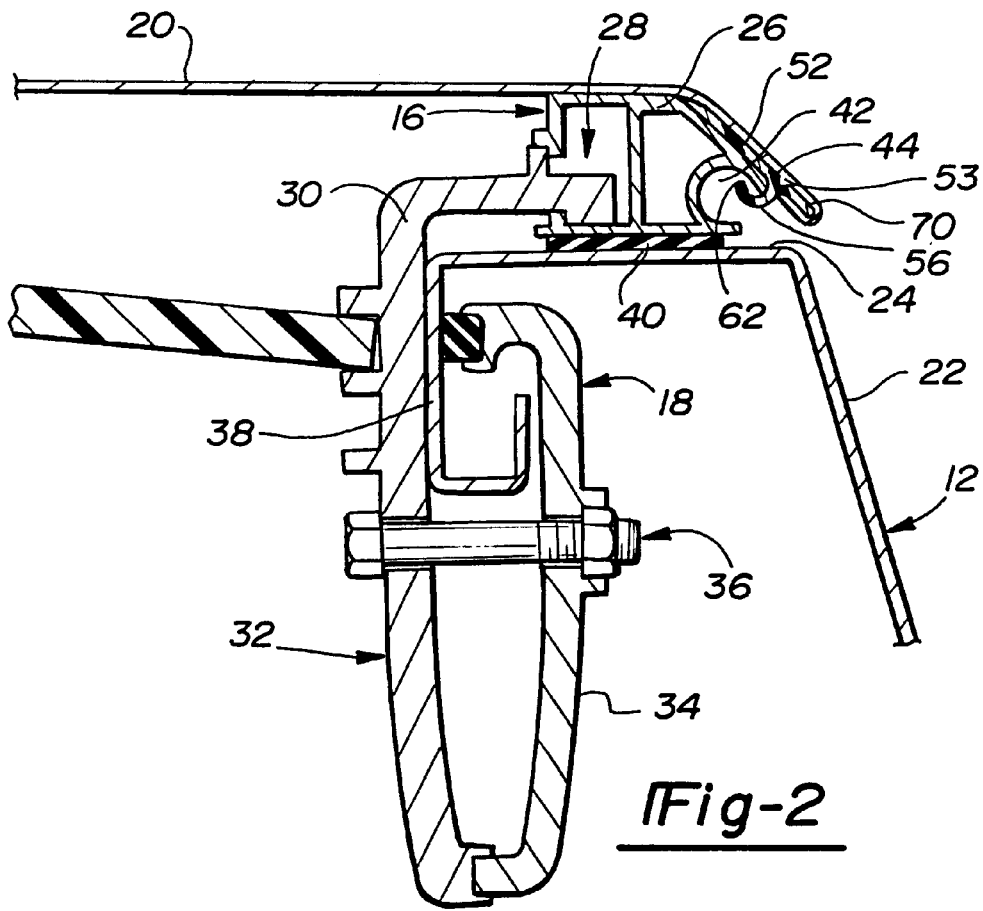
FIG. 2 is a sectional view of the tonneau cover frame and attachment for mounting the tonneau cover to the pick-up truck cargo box.

A tonneau cover system 10 of the present invention is shown in FIGS. 1 and 2 mounted upon a cargo box 12 of a pick-up truck 14. The tonneau cover system 10 includes a frame 16, only a portion of which is visible in FIG. 1, which is clamped to an upper end of a side wall 22 of the cargo box 12 by a plurality of clamps 18. A flexible fabric cover 20 is attached to the frame 16 so as to cover the opening of the cargo box 12.

The side wall 22 of the cargo box 12 has an upper surface 24 upon which the frame 16 is disposed. The frame 16 is constructed of a plurality of elongated rails 26 which are joined together at their ends to form a rectangular frame sized to fit on the cargo box 12. The rails 26 are typically made of extruded aluminum and are substantially uniform in cross section along their entire lengths. The rails 26 have a slot 28 on the inboard side into which an upper portion 30 of a first clamp member 32 is positioned and is slidable along the length of the rails 26. A second clamp member 34 is attached to the first clamp member 32 by a nut and bolt assembly 36 and traps a down turned flange 38 of the side wall 22 of the cargo box 12 between the clamp members 32, 34. This secures the clamp 18 to the side wall 22 of the cargo box 12 and in turn secures the frame 16 to the cargo box 12. A foam rubber tape 40 is attached to the bottom of the rail 26 to provide a protective seal between the rail 26 and the upper surface 24 of the cargo box 12 which aids in preventing scratching or marring of the cargo box finish by the aluminum rail 26. It is also contemplated that the rails be mounted to the inside of the cargo box and that a pair of rails be utilized as opposed to a rectangular frame.

The rail 26 includes an outboard slot 42 formed by a flange 44 which extends generally away from the interior of the cargo box 12. The flange 44 has a terminal or distal edge 46. The fabric cover 20 is attached to the flange 44 of the rail 26 by a j-strip or hook shaped fastener 50 described below.

The j-strip or hook shaped fastener 50, best seen in FIGS. 3–6, is an elongated extrusion which is attached to the fabric cover 20 along the edge thereof. The fastener 50 has a base portion 52 which is generally planar and rests against an inner surface 21 of the fabric cover 20. The base portion 52 terminates at one end in a tab 70. The base portion 52 is sewn to the fabric cover 20 with a pair of seams. A hook portion 56 of the fastener 50 includes a return bend which extends from the base portion 52 in a direction away from and on a side opposite of the fabric cover 20. The hook portion 56 turns generally toward the central region of the fabric cover 20 forming a bight 58 with a concave inner surface 60, and terminating in a distal end 62. The hook portion 56 has a nominal length L measured from the base portion 52 to the distal end 62. The concave inner surface 60 may be cylindrical or acylindrical. In the first embodiment of the fastener 50 shown in FIG. 4, the bight 58 has a generally cylindrical shape. In the second embodiment of the fastener 50 shown in FIG. 4A, the bight 58' has a "raked" shape defined by three separate radii of curvature. Proceeding along the concave inner surface 60 to the distal end 62, the first radius of curvature is greater than both the second and third, while the third radius of curvature is greater than the second. This raked shape of the bight 58' as shown in FIG. 4A allows the hook portion 56 to more quickly open and release from the flange 44 of the rail 26. The hook portion 56 intersects the base portion 52 at a merger point 63.

A hinge 53, formed in the base portion 52 of the fastener 50 as a notch, score, groove or crease, allows the hook portion 56 and the tab 70 to be manually pivoted which operates to widen or open the bight 58 of the hook portion 56, thereby aiding in the release of the hook portion 56 from the flange 44 of the rail 26.

In FIG. 4, the hinge 53 is illustrated as a radiused groove and is located opposite the hook portion 56 and the merger point 63. In an alternate embodiment, FIG. 4A illustrates the hinge 53' in a position opposite the hook portion 56, and forward of the bight 58' and the merger point 63. The location of the hinge 53' as shown in FIG. 4A is such that it begins at the center of the distal end 62 and terminates at a point farther away from the bight 58'. The shape of the hinge 53' shown in FIG. 4A differs from that shown in FIG. 4 and may be described as a slot with 90° corners. Obviously, other cross-sectional shapes for the hinge 53 may be used as well. Two such shapes, in addition to those previously mentioned, include partially round and V-shaped. Other shapes can readily be envisioned.

Preferably, the hinge 53 extends the entire length/width of the fastener 50. It is possible, however, that the hinge 53 could be formed over less than the entire length/width of the fastener 50.

The fastener 50 is mounted to the rail 26 by pulling on the fabric cover 20 and placing the bight 58 of the hook portion 56 around the terminal edge 46 of the flange 44 of the rail 26. This seats the terminal edge 46 of the flange 44 into the bight 58, contacting the concave inner surface 60 along a line of contact 84 (shown in FIGS. 5–9) which extends the length of the fastener 50 and the rail 26. This line of contact 84 is generally at the deepest point of the concave inner surface 60 of the bight 58 and is spaced from the distal end 62 of the hook portion 56.

Figure 7:
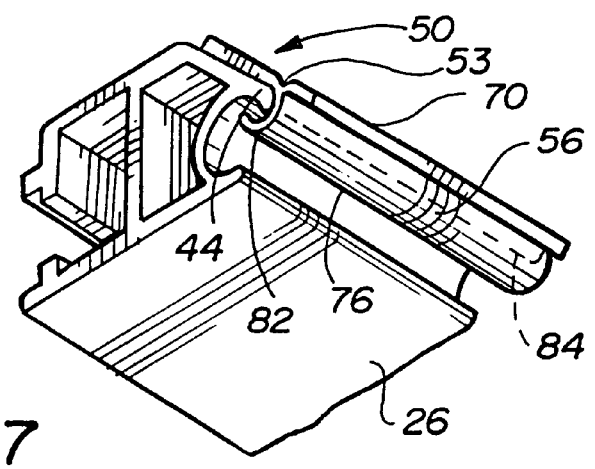
FIGS. 7, 8 and 9 are perspective views illustrating the process of removing the cover, having a fastener as seen above attached thereto from the frame, the process of mounting the cover to the frame being generally the reverse thereof.
Figure 8:
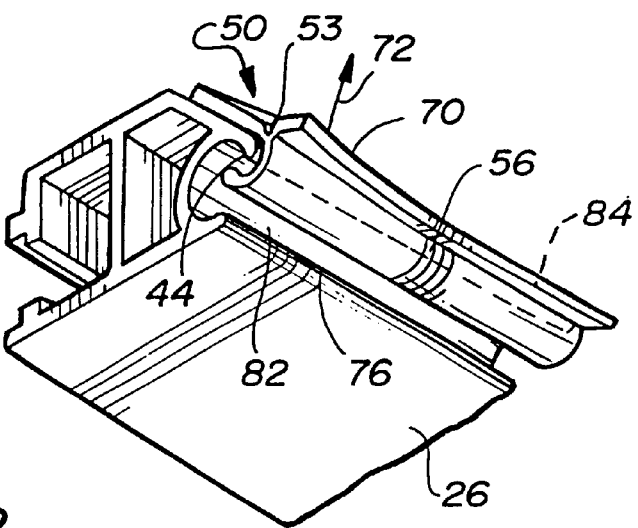
Figure 9:
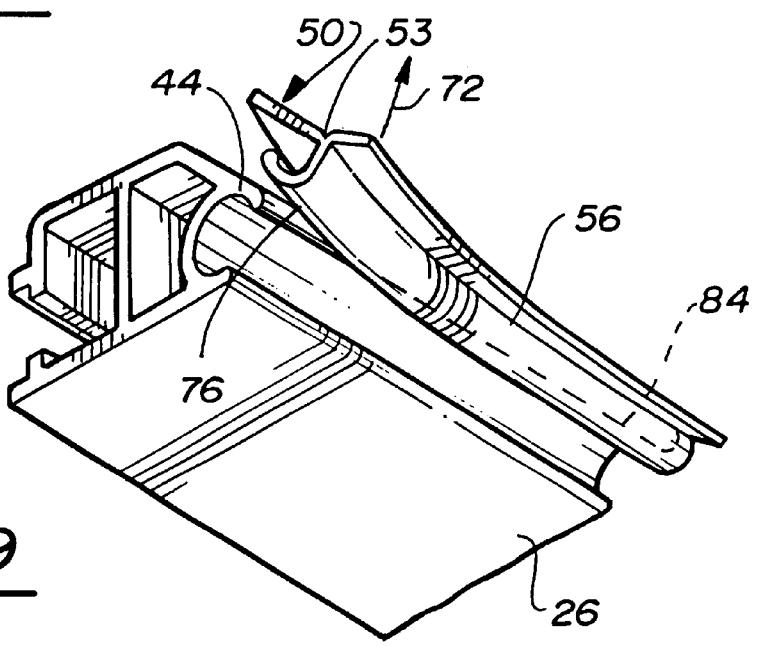

The base portion 52 of the fastener 50 extends rearward, beyond the hook portion 56, forming the tab 70. The fastener 50 is removed from the rail 26 by applying a force on the tab 70 in the direction of the arrow 72 as shown in FIGS. 3, 6, 8 and 9. With reference to FIGS. 7, 8 and 9, the progressive removal of the fastener 50 from the flange 44 of the rail 26 is shown in sequence.

The force applied in the direction of the arrow 72 is generally normal to the plane of the base portion 52 and the rail flange 44. The force applied in the direction of the arrow 72 causes the hook portion 56 and the tab 70 to pivot about the hinge 53 as shown in FIG. 6. This in turn widens or opens the bight 58 of the hook portion 56 slightly, allowing the line of contact 84 between the terminal edge 46 of the flange 44 and the bight 58 of the hook portion 56 to move gradually toward the distal end 62 of the hook portion 56. Further movement of the tab 70 of the fastener 50 in the direction of the arrow 72 causes the distal end 62 of the fastener 50 to clear the terminal edge 46 of the flange 44, thereby freeing the fastener 50 and the fabric cover 20 from the rail 26. The remainder of the fastener 50 and the fabric cover 20 will peel from the rail 26 as shown in FIG. 9 by continued lifting of the fastener 50 from the rail 26 along the entire length of the rail 26.

Generally, as stated above, removal of the fabric cover 20 is accomplished by starting at one corner of the tonneau cover system 10 and first removing the fastener 50 from the rail 26 at the end of the fastener 50. After an initial end portion of the fastener 50 is released from the rail 26, the remainder of the fastener 50 will easily peel away from the rail 26 by lifting the fabric cover 20. The greatest force is needed to initially move the hook portion 56 of the fastener 50 off the flange 44 of the rail 26.

In cold temperatures, the fabric cover 20 shrinks and the fastener 50 stiffens. This increases the force required to initially remove the fastener 50 from the rail 26. The above-described hinge 53 aids in facilitating removal of the fastener 50 from the rail 26 under such conditions.

The present invention provides a tonneau cover system 10 which eases the removal of the fabric cover 20 from the flange 44 of the rail 26 by providing a fastener 50 having a hinge 53. The fastener 50 including the hinge 53 reduces the force required for initiating the removal of the fastener 50.

It is to be understood that the invention is not limited to the exact construction illustrated and described above, but that various changes and modifications may be made without departing from the spirit and scope of the invention as defined in the following claims.

What is claimed is:

1. A tonneau cover for covering an area of a vehicle, said vehicle area being bounded by spaced side walls, said tonneau comprising:

a flexible fabric cover having side edges and a central region bounded by said side edges, said side edges being positionable above the vehicle spaced side walls so that said cover can extend over the vehicle area to be covered;

a plurality of elenogated rails, each having two ends, one of said rails being mounted to each vehicle side wall, at least one of said rails having a flange extending generally away from the vehicle area to a terminal edge;

an elongated fastener having two ends and being attached to said flexible cover along one of said side edges, said fastener having a base having a first side and a second side, said base attached to said flexible cover and a hook projecting from said first side of said base, said hook being formed by a return bend portion extending from said base generally away from said flexible fabric cover and then turning generally toward said central region of said cover forming a bight with a concave inner surface and ending in a distal end spaced from said fastener base, said return bend portion having a nominal length measured from said base to said distal end, said fastener being mounted to said rail by placing said bight around said rail flange with said terminal edge of said rail flange being seated in said bight and contacting said concave inner surface along a line of contact spaced from the distal end of said return bend portion; and said fastener having a hinging portion located on said second side of said base and being flexible to enable said return bend portion to be removed from said rail flange by pivoting said fastener about said hinging portion to move said line of contact between said rail and said bight toward and past said distal end of said fastener to remove said cover from said rail.

2. A tonneau cover for covering a cargo area of a vehicle, said cargo area being bounded by spaced side walls, said tonneau comprising:

a flexible fabric cover having side edges and a central region bounded by said side edges, said side edges being positionable above the vehicle spaced side walls so that said cover can extend over the vehicle cargo area;

an elongated rail mounted to each vehicle side wall, at least one of said rails having a flange extending generally away from the cargo area to a terminal edge;

an elongated fastener having ends attached to said flexible cover along one of said side edges, said fastener having a base having a first side and a second side, said base attached to said flexible cover and a hook projecting from said first side of said base, said hook being formed by a return bend portion extending from said base generally away from said flexible fabric cover and then turning generally toward said central region of said cover forming a bight with a concave inner surface and ending in a distal end spaced from said fastener base, said hook having a nominal length measured from said base to said distal end, said fastener being mounted to said rail by placing said bight around said rail flange with said terminal edge of said rail flange being seated in said bight and contacting said concave inner surface along a line of contact spaced from the distal end of the hook; and said fastener having a hinging portion located on said second side of said base and being flexible to enable said return bend portion to be removed from said rail flange by pivoting said fastener about said hinging portion to move hook from said rail.

3. The tonneau of claim 2 wherein said hinging portion is a crease.

4. The tonneau of claim 2 wherein said hinging portion is a notch.

5. The tonneau of claim 4 wherein said notch includes ninety degree corners.

6. The tonneau of claim 2 wherein said hinging portion is a curved depression.

7. The tonneau of claim 2 wherein said hinging portion is located in said base below a projection of said hook.

8. The tonneau of claim 2 wherein said hinging portion is located in said base in front of a projection of said hook.

9. The tonneau of claim 2 wherein said hook has an acylindrical shape.

10. The tonneau of claim 2 wherein said hook has a raked shape defined by a plurality of radii of curvature.

11. A tonneau cover for covering a cargo area of a vehicle, said cargo area being bounded by spaced side walls, said tonneau comprising:

a flexible fabric cover having side edges and a central region bounded by said side edges, said side edges being positionable above the vehicle spaced side walls so that said cover can extend over the vehicle cargo area;

an elongated rail having two ends mounted to each vehicle side wall, one of said rails having a flange extending generally away from the cargo area to a terminal edge;

an elongated fastener having ends attached to said flexible cover along one of said side edges, said fastener having a base having a first side and a second side, said base attached to said flexible cover and a hook projecting from said first side of said base, said hook being formed by a return bend portion extending from said base generally away from said flexible fabric cover and then turning generally toward said central region of said cover forming a bight with a concave inner surface and ending in a distal end spaced from said fastener base, said fastener being mounted to said rail by placing said bight around said rail flange with said terminal edge of said rail flange being seated in said bight and contacting said concave inner surface along a line of contact spaced from the distal end of the fastener; and said fastener having a crease portion located on said second side of said base and being flexible to enable said return bend portion to be removed from said rail flange by pivoting said fastener about said crease portion to move hook from said rail.

12. A tonneau cover for covering a cargo box area of a vehicle comprising:

a flexible cover being positionable above the cargo box area of the vehicle, the cargo box area including side walls;

a plurality of elongated rails, said rails mounted to said side walls and having a flange;

a fastener coupled to said flexible cover, said fastener including a base having a first side and a second side and a hook protecting from said first side of said base, said hook including a bight with a concave inner surface, wherein said fastener is mounted to said rail by placing said bight around said flange, said flange being seated in said bight and contacting said concave inner surface:

said fastener having a hinging portion located on said second side of said base and being flexible to enable said hook and a portion of said base of said hook to be pivoted about said hinging portion, wherein said pivoting opens said bight of said hook and releases said hook from said flange.

13. The tonneau of claim 12 wherein said hinging portion is a notch.

14. The tonneau of claim 13 wherein said notch includes ninety degree corners.

15. The tonneau of claim 12 wherein said hinging portion is a curved depression.

16. The tonneau of claim 12 wherein said hinging portion is located in said base below a projection of said hook.

17. The tonneau of claim 12 wherein said hinging portion is located in said base in front of a projection of said hook.

18. The tonneau of claim 12 wherein said hook has an acylindrical shape.

19. The tonneau of claim 12 wherein said hook has a raked shape defined by a plurality of radii of curvature.

20. The tonneau of claim 12 wherein said hinging portion is a crease.

* * * * *

UNITED STATES PATENT AND TRADEMARK OFFICE
CERTIFICATE OF CORRECTION

PATENT NO.    : 6,499,791 B2
DATED         : December 31, 2002
INVENTOR(S)   : Donald G. Wheatley It is certified that error appears in the above-identified patent and that said Letters Patent is hereby corrected as shown below:

Column 5,
Line 1, "elenogated" should be -- elongated --.

Column 6,
Line 54, "protecting" should be -- projecting --.

Signed and Sealed this

Twenty-sixth Day of August, 2003

JAMES E. ROGAN
*Director of the United States Patent and Trademark Office*